REELS

Filed Aug. 13, 1959

INVENTOR.
FREDERICK W. ROBERTS
JOHN R. MONTGOMERY

BY
Curtis, Morris & Safford
ATTORNEYS

United States Patent Office 3,064,917

Patented Nov. 20, 1962

3,064,917

REELS

Frederick W. Roberts, Fairfield, and John R. Montgomery, Trumbull, Conn., assignors to Dictaphone Corporation, Bridgeport, Conn.

Filed Aug. 13, 1959, Ser. No. 833,432
1 Claim. (Cl. 242—71.8)

The present invention relates to reels and more particularly to a spool type reel for winding and unwinding flexible strip material, such as film, ribbon, tape and the like, and is especially adapted for winding and unwinding magnetic recording tape in a recording instrument.

The reels commonly used for winding ribbon, film, tape etc. comprise a hub with continuous flanges at each end of the hub to provide a space therebetween in which the flexible strip is wound around the hub. Such reels are made of assembled parts which, in addition to fabricating the parts, requires the time and labor of handling and assembling the parts. It has been proposed to make a reel of molded plastic material, but the construction of a reel presents a considerable problem in molding it in one piece because the flanges, attaching means on the hub and mounting means at the axis of the hub present re-enterant surfaces in different planes. Furthermore, with reels of small diameter having closely spaced continuous flanges, it is difficult to attach the end of a strip to be wound.

One of the objects of the present invention is to provide a one-piece plastic reel with segmental flanges arranged to provide a symmetrical configuration on opposite sides to adapt the reel to be mounted on and driven by a winding spindle from either side.

Another object is to provide a reel construction which may be molded as one piece in finished form in a separable two-part intrusion mold.

Still another object is to provide a reel of the type indicated which is light in weight, of a simple, compact, strong and rigid construction, economical to manufacture and one which facilitates its mounting on and removal from the apparatus with which it is used as well as the attachment of a strip thereto.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claim.

Figures 1, 2, 3, 4:
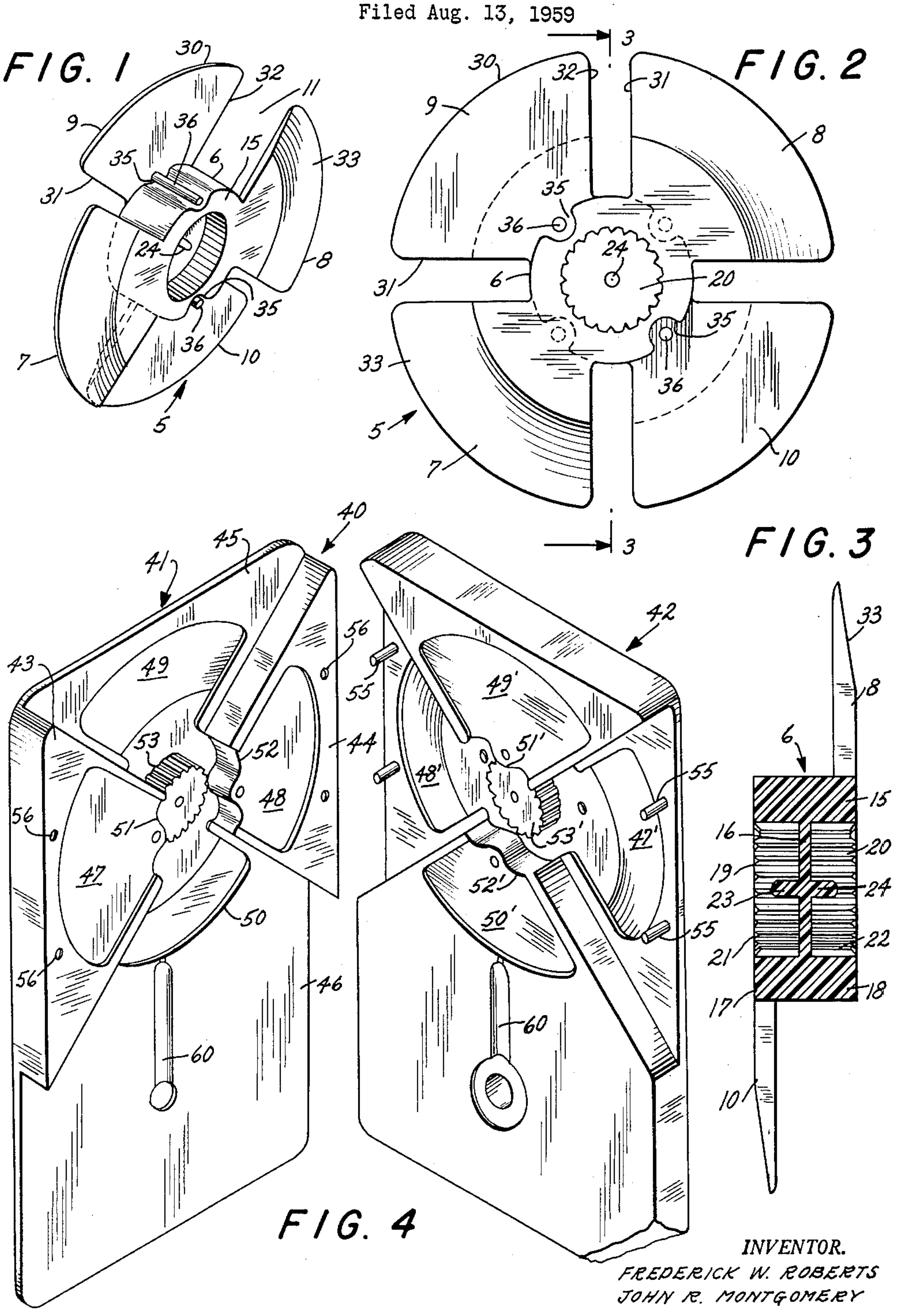
FIGURE 1 is a perspective view of a reel incorporating the novel features of the present invention.
FIGURE 2 is an enlarged view of one side of the reel and showing the successive flanges around the periphery of the hub with their adjacent edges spaced apart from each other.

FIGURE 3 is a further enlarged sectional view taken on line 3—3 of FIGURE 2 to show the mounting recesses at each end of the hub and successive wing flanges projecting from opposite ends of the hub alternately around its entire periphery; and FIGURE 4 is a perspective view of a two part mold in which the reel of the present invention may be cast as an integral structure and showing the manner in which the mold is parted to draw the forming sections from the reel.

Referring to FIGURES 1 to 3 of the drawing, a reel 5 is illustrated which incorporates the novel features of the present invention. The opposite sides of reel 5 are symmetrical to adapt it to be mounted on and locked to a driving spindle from either side. Reel 5 comprises a hub 6 and opposed pairs of wing flanges 7, 8 and 9, 10 projecting radially from each end of the hub, respectively. In the illustrated embodiment single pairs of wing flanges 7, 8 and 9, 10 are provided at each end of the hub 6, but it will be understood that a greater number of opposed pairs of wing flanges may be provided. Thus, the pairs of wing flanges 7, 8 and 9, 10 are spaced axially along the hub 6 to provide a space 11 therebetween for holding a strip wound on the hub.

In the illustrated embodiment, hub 6 comprises an annular rim 15 with a medial septum 16 midway between the ends 17 and 18 of the hub. Thus, the hollow hub 6 provides circular recesses 19 and 20 of identical construction at opposite sides of the septum 16. The peripheries of the axial recesses 19 and 20 have axially extending ribs 21 and 22 projecting inwardly therefrom to provide a serrated surface for driving engagement with corresponding shaped serrations on a driving spindle, not shown. Also projecting from the septum 16 at the axis thereof are pins 23 and 24 for centering the reel 5 on the spindle with which it is used.

Each wing flange 7, 8, 9 and 10 is formed as an integral part of the hub 6 and projects radially therefrom. The segmental wing flanges 7, 8, 9 and 10 are each of wedge shaped configuration having a circular outer edge 30 and inwardly directed straight side edges 31 and 32. The inside faces of the pairs of wing flanges 7, 8 and 9, 10 at opposite ends of the hub 6 may have a slight taper outwardly from the hub to the tips, but in the illustrated embodiment they are shown positioned in axially spaced planes normal to the axis. The outside faces of each pair of wing flanges 7, 8 and 9, 10 in the reel 5 illustrated extend outwardly from hub 6 in a common plane for a substantial area with outer annular sections 33 beveled inwardly and the outer edges 30 between the inner and outer surface have a rounded contour. Each of the flanges 7, 8 and 9, 10 of the pairs have a shorter arcuate width between its edges 31 and 32 than the arcuate width between the edges of flanges of a pair.

Each wing flange 7 and 8 of the pair at one end 18 of the hub 6 is positioned centrally between the wings 9 and 10 of the pair at the opposite end 17 of the hub. As the arcuate width of each wing flange 7, 8, 9 and 10 is less than the space between wing flanges of a pair, the edges 31 and 32 of successive flanges around the periphery of the hub 6 are spaced from each other. Furthermore, the adjacent edges 31 and 32 of wing flanges 7, 9 and 8, 10 are parallel to each other in the reel illustrated, but may be inclined to each other.

The reel 5 also is provided with a structure for attaching the end portion of a strip to be wound. In the illustrated embodiment the structure comprises diametrically opposed semi-circular recesses 35 in the hub extending from the center of each wing flange 7, 8, 9 and 10 to the opposite end of the hub and a pin 36 projecting axially from the wing over the circular recess to facilitate attachment of the end of a strip to be wound by sliding it axially under a pin in the open space between wing flanges of a pair. The hub 6, wings 7, 8, 9 and 10, septum 16, centering pins 23 and 24 and opposed strip attaching recesses 35 and pins 36 are all formed as an integral one-piece structure and provide a symmetrical configuration at opposite sides of the reel.

The reel 5 may be made of any suitable material such as a thermosetting plastic molded in an integral one-piece structure. One particular plastic which has been successfully used is a styrene type thermoplastic resin made by Marbon Chemical Div. of Borg-Warner Corp. and sold under the trade name "Cycolac H2500." This resin possesses the combination of toughness, impact strength, and dimensional stability required.

The reel 5 of the present invention may be made in a mold 40 illustrated in FIGURE 4 having separable parts 41 and 42. As will be observed in FIGURE 4, the face of part 41 of the mold 40 is divided into four quadrants with two of the quadrants 43 and 44 raised with respect to the quadrants 45 and 46 a distance equal to the length of hub 6. Each of the quadrants 43, 44 and 45, 46 is formed to provide impressions 47, 48 and 49, 50 corresponding to one-half of the wing flanges 7, 8 and 9, 10, respectively. The opposite edges 51 and 52 of the raised quadrants 43 and 44 are of a contour to form the opposite sides of hub 6 and a raised boss 53 forms one recess 19. The opposite section of the mold 42 is exactly reversed to the section 41 of the mold and having impressions 47′, 48′ and 49′, 50′ forming the other side of each of the wing flanges 7, 8 and 9, 10, respectively, edges 51′ and 52′ forming opposite sides of hub 6 and a raised boss 53′ forming recess 20. The separable parts 41 and 42 of the mold 40 having aligning pins 55 and cooperating holes 56 to align the reversed interleaving sections. When the sections 41 and 42 of the mold are mated, the edges of the quadrants engage to form a recess therein having the contour of the reel 5. A reel 5 is formed by forcing a thermosetting plastic into mold 40 through gate 60. After the plastic sets, the separate sections 41 and 42 of the mold 40 are parted and the reel removed. It will be observed that the construction of the reel 5 permits the projecting cores of the mold parts 41 and 42 to be withdrawn from the molded reel 5 at right angles thereto. The flashing projecting from the edge of wing flange 50 of the reel 5 is then removed.

It will now be observed that the present invention provides a one-piece plastic reel which is of symmetrical form at opposite sides to adapt it to be reversed in use. It also will be observed that the present invention provides a reel construction which may be molded in an integral one-piece construction in a two part intrusion mold. It will still further be observed that the present invention provides a reel of a lightweight, strong and rigid construction which is economical to manufacture and facilitates the mounting on and removal from the apparatus with which it is used.

While a single embodiment of the invention is herein illustrated and described, it will be understood that changes may be made in the construction and arrangement of elements without departing from the spirit or scope of the invention. For example, the inside faces of the wing flanges of opposite pairs may be tapered outwardly away from each other from the hub to the tips, the outside faces of the wing flanges may be normal to the axis or tapered inwardly and the hub may have other forms of driving and strip attaching means. Therefore, without limitation in this respect the invention is defined by the following claim.

We claim:

A one-peice plastic reel spool of symmetrical configuration at opposite sides for reeling flexible strip material comprising a cylindrical hub having a continuous peripheral surface, wedge-shaped wing flanges projecting radially from each end of the hub successively around the periphery with the wing flanges at one end alternating with the wing flanges at the opposite end to provide an axial space therebetween, the wing flanges at each end of the hub having an arcuate width less than the space between adjacent wing flanges, the wing flanges at one end being offset with respect to the wing flanges at the opposite end of the hub so that edges of adjacent flanges around the periphery of the hub are spaced from each other, said arrangement of said wing flanges permitting manual manipulation of the strip material between the wing flanges, and means for attaching the strip material to be wound onto the hub in the space between adjacent flanges and comprising a pin projecting axially from each wing flange and overlying the hub in the space between wing flanges at opposite ends of the hub and formed as an integral part of the flange.

References Cited in the file of this patent

UNITED STATES PATENTS

| | | |
|---|---|---|
| 1,421,933 | Fulda | July 4, 1922 |
| 1,497,166 | Canfield | June 10, 1924 |
| 2,247,881 | Hatfield | July 1, 1941 |
| 2,574,883 | Medal | Nov. 13, 1951 |
| 2,881,894 | Regentrop et al. | Apr. 14, 1959 |
| 2,894,700 | Roberts et al. | July 14, 1959 |
| 2,954,941 | Hultgren | Oct. 4, 1960 |

FOREIGN PATENTS

| | | |
|---|---|---|
| 113,895 | Great Britain | Mar. 14, 1918 |
| 673,012 | Germany | Mar. 14, 1939 |